US010421322B1

(12) United States Patent
Samocki et al.

(10) Patent No.: US 10,421,322 B1
(45) Date of Patent: Sep. 24, 2019

(54) METHOD OF WIRELESSLY CONNECTING A TIRE MONITOR IN A TRUCK CAB TO A TRANSCEIVER ON A SEMI-TRAILER

(71) Applicant: Doran Mfg. LLC, Cincinnati, OH (US)

(72) Inventors: James Clifford Samocki, Cincinnati, OH (US); Lee Anthony Demis, Cincinnati, OH (US); Christian Peter Nau, Cincinnati, OH (US); Jie Shen, Shanghai (CN)

(73) Assignee: DORAN MANUFACTURING, LLC, Cincinnati, OH (US)

( * ) Notice: Subject to any disclaimer, the term of this patent is extended or adjusted under 35 U.S.C. 154(b) by 0 days.

(21) Appl. No.: 15/993,735

(22) Filed: May 31, 2018

(51) Int. Cl.
*B60C 23/04* (2006.01)
*H04L 12/26* (2006.01)

(52) U.S. Cl.
CPC ...... *B60C 23/0447* (2013.01); *B60C 23/0471* (2013.01); *H04L 43/04* (2013.01); *H04L 43/10* (2013.01)

(58) Field of Classification Search
CPC ............ B60C 23/0447; B60C 23/0442; B60C 23/0455; B60C 23/0466; B60C 23/0471; B60C 23/0476; B60C 23/007; B60C 23/009; B60C 23/0401; B60C 23/0408; B60C 23/0415; B60C 23/00; B60C 23/0483; B60R 25/10; H04L 43/03; H04L 43/10

USPC ....... 340/442, 445, 447, 449; 73/146, 146.2, 73/146.5, 146.8; 116/34 R; 200/61.22, 200/61.24; 701/1, 29, 31
See application file for complete search history.

(56) References Cited

U.S. PATENT DOCUMENTS

| | | | | |
|---|---|---|---|---|
| 6,246,317 B1 * | 6/2001 | Pickornik | ............. | B60C 23/007 340/442 |
| 7,940,163 B2 * | 5/2011 | Huang | .................. | B60C 23/007 340/426.33 |
| 2010/0019881 A1 * | 1/2010 | Shimura | ............... | B60C 23/007 340/10.1 |
| 2010/0283594 A1 * | 11/2010 | Li | ......................... | B60C 23/009 340/447 |

* cited by examiner

*Primary Examiner* — Hung T Nguyen
(74) *Attorney, Agent, or Firm* — Dinsmore & Shohl LLP

(57) ABSTRACT

Pairing information signals are transmitted for a selected period of time after the transceiver powers up. Generally identical heartbeat signals are transmitted by the transceiver for a longer period of time than the pairing information signals. When the monitor receives the pairing information, it will connect to the transceiver; however, if the monitor does not receive a selected number, e.g. 3, of heartbeat signals, it will disconnect from the transceiver and enter a standby mode, whereupon if the required heartbeats are received, the monitor will connect to the transceiver emitting them. Once connected in this manner, the monitor is able to process the tire sensor data relayed by the transceiver.

9 Claims, 2 Drawing Sheets

METHOD OF WIRELESSLY CONNECTING A TIRE MONITOR IN A TRUCK CAB TO A TRANSCEIVER ON A SEMI-TRAILER

TECHNICAL FIELD

The present invention relates to electronic tire monitoring systems (TPMS), and more particularly to a method of correctly engaging a cab-mounted monitor with a tire data-relaying transceiver on a trailer attached to the cab.

BACKGROUND OF THE INVENTION

Due to the range limitations of the tire sensors, the truck trailer may be equipped with a signal booster or transceiver that receives the tire sensor RF signals and transmits them to a monitor in the truck cab. The monitor then alerts the driver if a tire falls below or rises above established pressure or temperature ranges The problem addressed by the present invention arose when trailers were being connected to tractors at a busy yard or terminal where there were many tractors and trailers engaged in or awaiting transfers of the same sort. In the past, operators were required to manually adjust or calibrate the monitor to receive RF signals from the transceiver on the newly connected trailer. This required the operator's time and attention, thereby slowing the transfer process and creating the possibility of an acccident due to the operator's distraction. In addition, if the transceiver on a neighboring trailer was powered up, the monitor in the newly connected assembly could mistakenly be synchronized with the transceiver on the wrong trailer. If this occurred, the operator or a technician was obliged to correct the situation, thereby creating opertor anxiety or frustration, additional delay and greater possibility of an accident. Thus, there was a need to design the TPMS equipment so that the monitor and transceiver could be connected automatically and, if the wrong transceiver were engaged, to correct the error with little or no operator involvement or attention.

SUMMARY OF THE INVENTION

As currently embodied, the invention is a method of wirelessly connecting and disconnecting a monitor mounted in a vehicle cab and a transceiver mounted on a trailer. The transceiver is adapted to relay tire sensor signals to the monitor, and the monitor is adapted to process the tire sensor signals. The present method basically comprises the steps of: (a) transmitting pairing information signals from the transceiver for a selected period of time after the transceiver powers up; (b) transmitting generally identical heartbeat signals from the transceiver for a longer period of time than the pairing information signals; connecting the monitor and the transceiver if the monitor receives the pairing information signals; and (d) disconnecting the monitor and the transceiver if the monitor does not receive a selected number of the generally identical heartbeat signals. Preferably, the present method includes the step of maintaining the connection between the monitor and the transceiver if the monitor receives the selected number of generally identical heartbeat signals.

DETAILED DESCRIPTION OF AN EXEMPLARY EMBODIMENT

Figure 1:
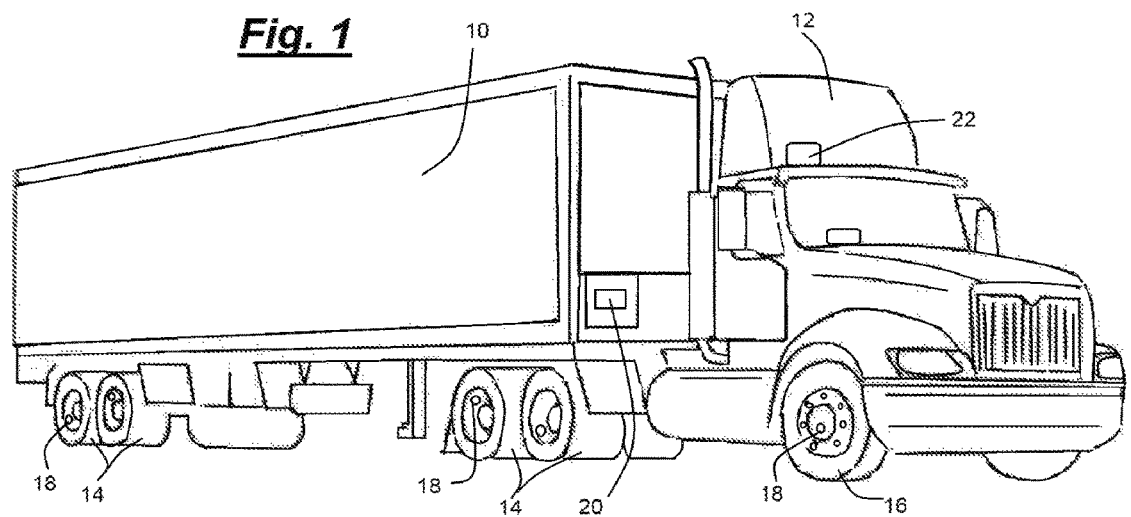
FIG. 1 illustrates a semi-trailer and truck cab equipped with tire pressure and temperature devices through which the present invention may operate.

As illustrated in FIG. 1, the present embodiment is well suited for use on highway cargo carriers such as a semi-trailer 10 and a detachable tractor or cab 12. Each of the tires 14 on the trailer (as well as the tires 16 on the tractor) may be equipped with an electronic sensor 18. The sensors are adapted to measure the air pressure and temperature of the tires and to transmit this information via an RF signal to a transceiver 20 mounted on the trailer. The sensors on the tractor tires may transmit this data directly to a monitor 22 mounted in the cab 12. The transceiver 20 acts as a relay so that the temperature and pressure data transmitted by the tire sensors can reach the cab monitor. Typically, the transceiver is pre-programmed with the identification codes that each of the trailer sensors transmits, as well as with their locations. This programming step may be accomplished with the use of handheld tablet (not shown) onto which the sensor locations and identifications have been downloaded. This data is then transferred to the transceiver when the tablet is brought into proximity. In this manner, transmissions from sensors on neighboring trailers may be rejected by the transceiver. The transceiver transmits via RF signal the tire location and sensor data to the monitor.

In addition, and more particularly in connection with the present embodiment, the transceiver sends out pairing information 31 (FIG. 2) for a selected period of time, such as five minutes, after being powered up. It also transmits generally identical heart beat signals 33 (FIG. 2) at a selected time interval, such as every 30 seconds, for a longer period of time than the pairing information signals. As described in further detail below, these two signals enable the monitor 22 to connect to and, if necessary, to disconnect from, a transceiver without requiring the assistance of the truck operator or a technician. Once the proper connection is made, the monitor 22 processes and displays the sensor data. It may generate an audio alarm if a tire's pressure or temperature falls outside a pre-selected range.

Figure 2:
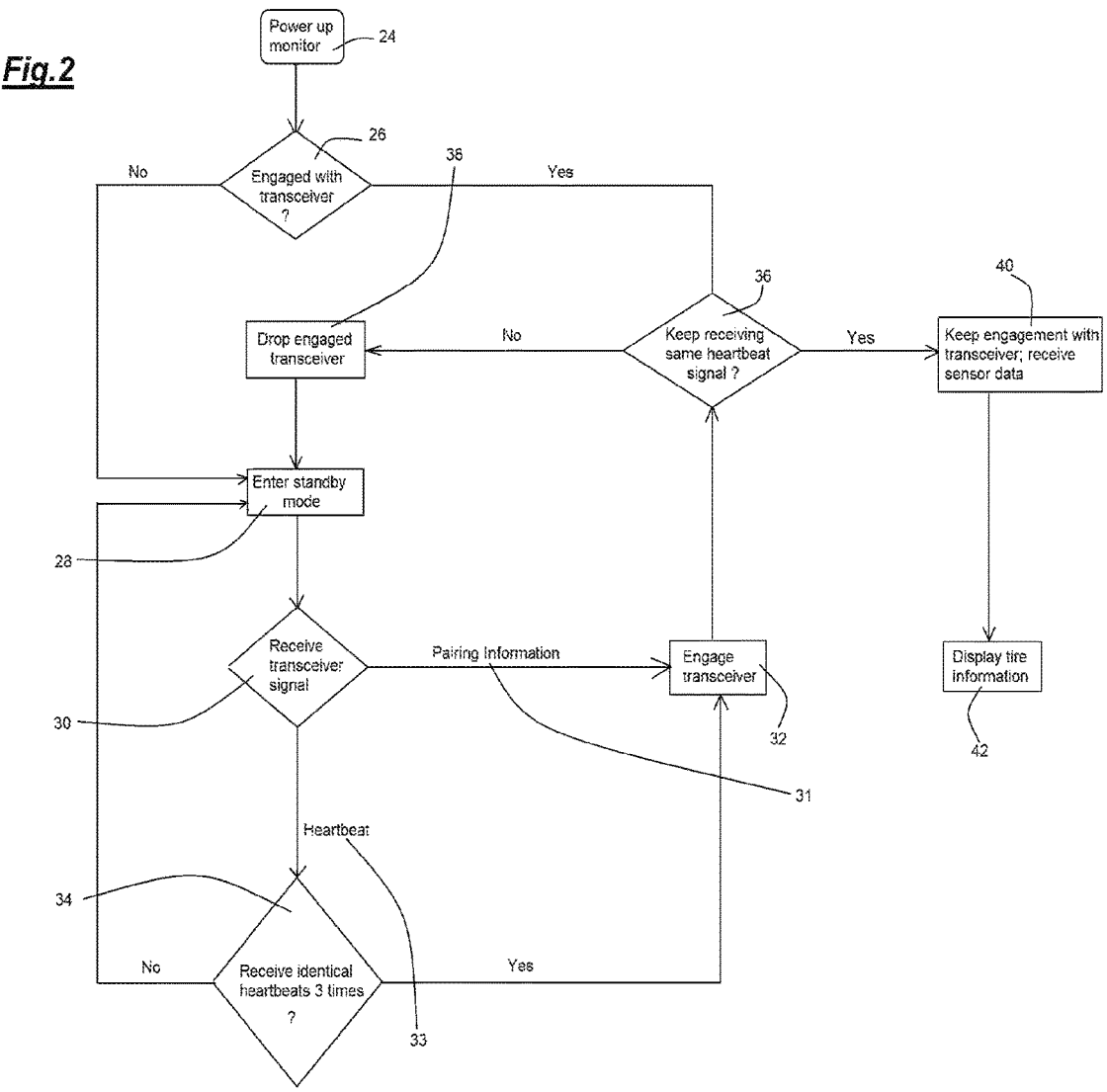
FIG. 2 is a flow chart of an exemplary manner in which the present invention may operate.

As diagrammed in FIG. 2, at the outset, the monitor is powered up 24. Electrical circuitry may be provided so that the monitor is energized when the tractor's engine is started. The monitor then determines if it is engaged with a transceiver 26. If a semi-trailer is connected to the cab, the transceiver on the semi-trailer may be powered up when the engine is started, just like the monitor, and begin transmitting RF signals. The monitor will recognize this pre-existing connection. However, if the monitor is not engaged with a transceiver upon start up, it will enter a standby mode 28. In this condition, the monitor is receptive to RF signals 30 from any transceiver within range. If such signals contain pairing information 31, the monitor will engage the transceiver from which they were emitted 32 without delay. However, if the monitor receives a heartbeat signal 33, it will only engage the transceiver 32 if the same, identical heartbeat signal is received a predetermined number of times, such as three, sequentially and without receiving any intervening, non-identical heatbeat. If the same heartbeat is not received the required number of times, the monitor returns to standby mode 28.

The transceiver may be programmed to send pairing information for only a selected period of time, such as five minutes, after it is powered up. In this manner, the number of pairing information signals emitted by different transceivers in a filled semi-trailer yard, and the chances of the monitor engaging the wrong one, may be limited.

On the other hand, the transceiver may be programmed to emit heartbeat signals at a selected interval, such as every 30 seconds, for substantially longer than the pairing information signals, for instance, for as long as it is powered up. Such ongoing heartbeats enable the monitor to determine if it is connected to the correct transceiver and to correct the situation if it is not, as described below.

Once the monitor is connected to a transceiver, it continues to receive heartbeats and is able to determine whether those heartbeats are substantially identical 36. If they are not, the monitor drops the transceiver 38 and returns to standby mode 28. This might occur, for instance, if the monitor engaged a transceiver on a neighboring semi-trailer. As the truck pulled away from the neighboring trailer, the heartbeats from the neighboring transceiver would fade and those from the trailer to which it was actually connected would emerge. Since the heartbeats from the two transceivers would be different, the monitor would disconnect from the wrong transceiver and return to the standby mode. At that point, the receipt of successive heartbeats from the correct transceiver would cause the monitor to connect to it. If the heartbeats are identical, the monitor remains engaged and processes and displays the sensor data being relayed by the transceiver 40.

The invention claimed is:

1. A method of wirelessly connecting and disconnecting a monitor mounted in a vehicle cab and a transceiver mounted on a trailer, wherein the transceiver is adapted to relay tire sensor signals to the monitor and the monitor is adapted to process the tire sensor signals, said method comprising the steps of:

transmitting pairing information signals from the transceiver for a selected period of time after the transceiver powers up;

transmitting generally identical heartbeat signals from the transceiver for a longer period of time than the pairing information signals;

connecting the monitor and the transceiver if the monitor receives the pairing information signals; and disconnecting the monitor and the transceiver if the monitor does not receive a selected number of the generally identical heartbeat signals.

2. The method according to claim 1, which further comprises the step of maintaining the connection between the monitor and the transceiver if the monitor receives the selected number of generally identical heartbeat signals.

3. The method according to claim 2, wherein the monitor receives the selected number of generally identical heatbeat signals without any intervening nonidentical heartbeat signals.

4. The method according to claim 3, which further comprises the step of processing the tire sensor signals relayed by the transceiver once the monitor receives the selected number of generally identical heartbeat signals.

5. The method according to claim 1, wherein the steps are accomplished automatically.

6. The method according to claim 1, wherein the heartbeat signals generated by one transceiver differ from the heartbeat signals generated by another transceiver.

7. The method according to claim 1, wherein the selected period of time for transmitting the pairing information signals is about five minutes.

8. The method according to claim 1, wherein the longer period of time for transmitting the heartbeat signals continues as long as the transceiver is powered up.

9. The method according to claim 1, which further comprises placing the monitor in a standby mode when it is not connected to the transceiver.

\* \* \* \* \*